G. M. WHITIN.
SPINDLE.
APPLICATION FILED MAY 7, 1913.
1,074,996.
Patented Oct. 7, 1913.
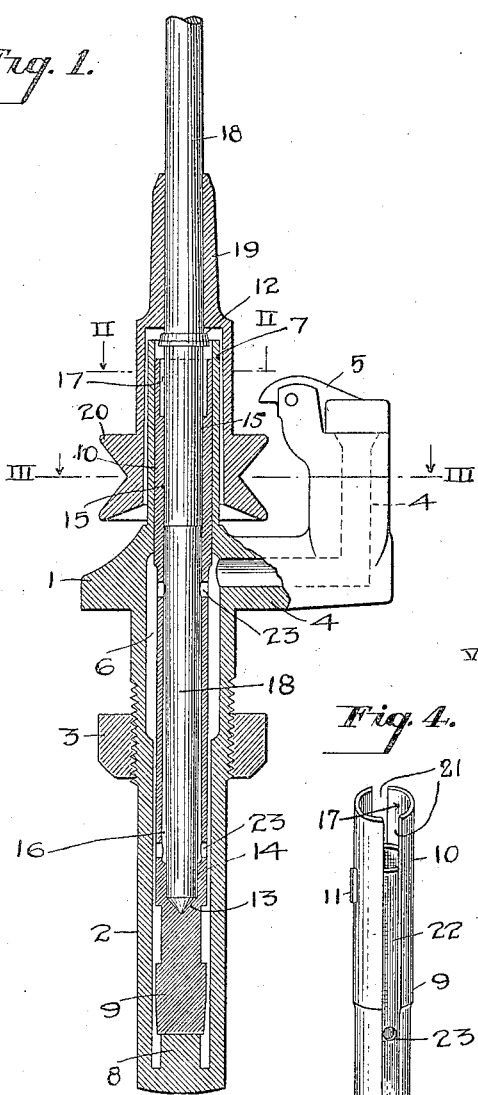
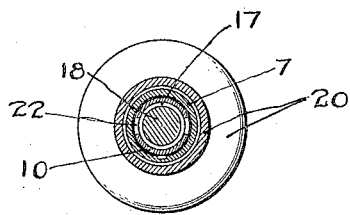
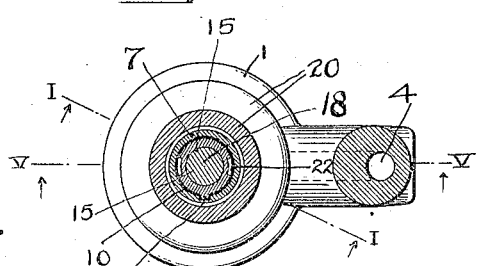
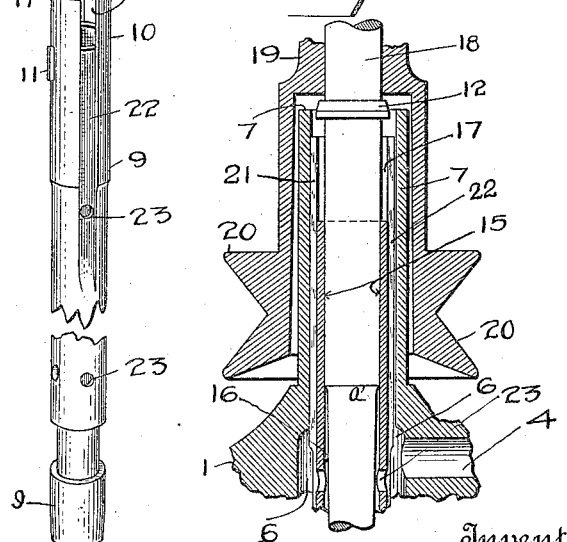
Witnesses:
Inventor
George M. Whitin
By Attorney

UNITED STATES PATENT OFFICE.

GEORGE M. WHITIN, OF WHITINSVILLE, MASSACHUSETTS, ASSIGNOR TO THE WHITIN MACHINE WORKS, OF WHITINSVILLE, MASSACHUSETTS, A CORPORATION OF MASSACHUSETTS.

SPINDLE.

1,074,996.      Specification of Letters Patent.      Patented Oct. 7, 1913.

Application filed May 7, 1912. Serial No. 695,617.

*To all whom it may concern:*

Be it known that I, GEORGE M. WHITIN, a citizen of the United States, and a resident of Whitinsville, in the county of Worcester and State of Massachusetts, have invented the following-described new and useful Improvements in Spindles.

The invention relates more particularly to self-contained and self-balancing spindles for ring-spinning frames, and its object is to improve the action of such spindles in respect of their lubrication and the power required for driving them.

To this end the invention is concerned especially with a certain disposition of the bearings for the spindle-blade upon the bolster and of the bearings of the latter upon the bolster-case, together with an arrangement of clearances coöperating with such bearings and the other elements to produce a smooth running spindle consuming a minimum of power and adapted to be safely used at high speeds without risk of oil slinging.

In the one sheet of drawings forming part hereof, Figure 1 represents in central longitudinal section on line I—I of Fig. 3, a spindle having its bearings and clearances arranged according to this invention. Fig. 2 is a cross-section of Fig. 1 on line II—II. Fig. 3 is a cross-section on the line III—III. Fig 4 is a perspective broken view of the bolster proper; and Fig. 5 is an enlarged sectional detail of the upper spindle bearing on line V—V of Fig. 3.

The general principle of construction of the new spindle and its mode of operation are the same as now universally used and known as the self-balancing type. The bolster case is formed of one piece with a head-flange 1 and a depending tubular body portion 2, which is to be inserted in an aperture in the spindle rail and clamped rigidly thereto by the nut 3, which is threaded to the exterior of the body, as will be well understood. The head flange 1 is formed with a laterally extending and upturned arm in which an oil supply duct 4 is formed, and the end of the duct in the upstanding part of the arm has a cover 5 in the form of a pivoted detent for locking the spindle against accidental removal from the case. The oil duct 4 leads to the top of an interior enlargement or chamber 6 inside the body of the bolster case, which chamber serves as a reservoir for the supply of oil for lubricating the bearings of the spindle as later explained, such oil being introduced through the oil duct, as will be understood.

Above the oil reservoir the bolster case is provided with a tubular boss 7 upstanding rigidly from the head flange 1 and formed in one piece therewith. When the bolster case is clamped to the spindle rail the tubular boss 7 becomes thereby rigidly supported in an upright and fixed position, in which its interior surface forms the bearing for the bolster proper, while its exterior is surrounded by the sleeve whirl though not in contact therewith. The bolster proper consists of a solid one-piece metallic tube, as shown more clearly in Fig. 4, externally shaped to fit non-rotatably and loosely within the bolster case, resting thereon at the bottom upon a step-piece 8, which projects upwardly from the bottom end of the case. The top of this step piece is flat, as is also the foot 9 of the bolster which rests on it, so that the lower end of the bolster will thus be free to find its own position in the case according to the well understood action of self-balancing spindles. The upper portion of the bolster tube is of somewhat larger outside diameter, as indicated at 10 in Fig. 4, and fits the bore of the rigid boss 7 to about two to six thousandths of an inch, so that the upper as well as the lower portion of the bolster is capable of sufficient lateral movement to provide for its self-adjustment to the axis of rotation of the loaded spindle. The heavy lines in Figs. 2 and 3 are intended to indicate the looseness of fit of the bolster within its rigid boss 7. The interior bore of the boss and the exterior surface 10 of the bolster are both preferably cylindrical, and the engagement or contact the latter has with the former, extends from the top of the oil reservoir 6 upward, to a point slightly below the upper end of the boss 7, thus forming a long bearing for the bolster which is intersected near its middle by the plane of the whirl and spindle-band.

In operation, the pull of the spindle-band presses the cylindrical surface of the bolster against the corresponding surface of the bore of the boss, and thereby, by reason of the extended length of such contact, tends to aline the tube and spindle positively with the axis of the spinning ring. The bolster is shorter than the interior of the bolster case and the oil-shield 12 on the spindle-blade overhangs its upper end in the space thus provided within the top of the boss. A key 11 is formed on or secured to the bearing surface 10 to engage a corresponding vertical key-way in the bore of the boss to hold the bolster from rotating with the spindle blade.

The interior of the one-piece bolster is bored and accurately reamed to provide the bearings for the spindle blade, there being two only of such bearings, each of limited extent, as presently explained. The lower part of the spindle blade is tapered and formed with a conical, pointed end, 13, and the corresponding portion of the bolster is bored to form a uniform metal to metal contact with the pointed end, and also preferably with a portion of the tapered surface above the pointed end as indicated by 14. Such contact should preferably not extend upward from the conical point more than one and one-half diameters of the spindle at that point. The upper spindle bearing marked 15, and which forms the sole lateral support of the spindle above the foot-step, is substantially centered longitudinally between the upper and lower ends of the bolster bearing 10 above referred to, so that it is thus also substantially bi-sected by the horizontal plane of the spindle-band. This upper spindle bearing is preferably cylindrical and is of reduced length as compared to upper spindle bearings heretofore used. Its length is reduced in the present case by enlarging or lengthening the spindle clearance 16 that separates it from the surface 14 of the foot-step bearing, so that such clearance will extend upwardly as shown in Fig. 1 from the foot-step bearing to a point some distance above the top of the oil reservoir. This clearance is conveniently formed by boring the bolster straight and making the spindle blade tapering, the taper running from the full diameter indicated by the line $a$ in Fig. 5, to the bearing surface 14 of the foot-step. The length of the upper spindle bearing 15, is reduced also at the upper end by providing a special spindle clearance in the top of the bolster which is done by counter-boring the same as indicated at 17 in the drawings.

When the spindle blade 18 is in contact with the aforesaid spindle bearings, the whirl 20 overhangs and surrounds the boss 7 as above stated. According to the customary and most convenient method of manufacturing spindles, the whirl is mounted on the spindle by driving or forcing its hub 19 downwardly against the upward taper of the upper part of the spindle blade until it is forcibly brought to its desired position thereon just above the oil shield 12. The force necessary to produce a good driven fit, causes a disturbance or thickening of the metal of the blade just in advance of the hub as it is moved to place, this disturbance being within the whirl where it cannot readily be corrected. I have observed that the shape or section of the blade as originally finished is thus distorted for a distance equal to about two diameters of the spindle, more or less, below the hub, depending upon the force used, so that if the portion of the spindle-blade immediately below the hub and oil shield forms any part of the upper spindle bearing, the proper metal to metal contact of such bearing is apt to become interrupted, thereby producing friction and increased power consumption, besides interfering seriously with the balance and smooth running of the spindle. According to this invention, the downward extent or depth of the counterbore 17 is made sufficient to include such distorted region, and thus avoid the objections noted, being at the same time coördinated with the length of the upper spindle bearing, so that the latter will be substantially bi-sected by the plane of the spindle band as above stated, the lower clearance 16 being extended upwardly a suitable amount for this purpose, as already explained. In spindles of standard and approved proportions these reductions of the bearing 15 leave a true metal to metal contact for the blade upon the bolster equal in length to not more than three times the diameter of the blade at the bearing, that is to say, the diameter of the spindle blade at the bearing equals or is greater than one third of the vertical length of the bearing, and I have ascertained that such relationship of the bearings and clearances in a self-balancing spindle of the kind described is effective under conditions of ordinary running to reduce the power consumption per spindle by at least as much as ten per cent. and frequently as much as twenty per cent., which in the aggregate represents a very desirable economy in the spinning frame as a whole. The said relationship of bearings and clearances moreover affords a substantial improvement in the lubrication of the spindle in that the upper open clearance 17 serves as an upper oil reservoir for the oil working upward on the spindle blade through the spindle bearing 15. The side walls of this counterbored reservoir are cut away to form two lateral outlets 21 (Fig. 4) which communicate with the longitudinal channels 22 formed on the outside of the bolster and leading downwardly through the alining bearing 10, of the bolster on the boss 7, to the main oil supply reservoir 6, where the bolster is provided with holes 23, to give access for the oil to the lower part of the spindle blade. When the blade is in rotation a continuous unrestricted circulation of oil takes place from the reservoir through the holes in the bolster, upward on the spindle-blade to the said upper reservoir 17 and thence back by way of the outlets 21 and the exterior channels 22 to the reservoir 6. Through the maintenance of true and uniform metal to metal contact for the upper spindle bearing and also, as I believe, by reason of the capacity of the upper clearance to hold and collect oil, a further advantage is gained in that the tendency for the oil to work on to the inside of the whirl whence it will be slung off on to the yarn by the centrifugal effect, is very appreciably diminished, which permits the spindle to be run at higher speeds without risk of soiling the yarn, or to be used with lubricating oil of less specific gravity, either of which is obviously desirable. Together with the new objects attained as above stated, the retention of the long alining bearing between the bolster tube and the boss 7, with a spindle bearing the length of which is reduced at both ends and toward the center of such bolster-alining bearing, the whole being substantially centralized to the spindle-band plane, insures stability and proper balancing effect for the loaded spindle.

I claim—

1. A self-contained, self-balancing spindle comprising a bolster case having an upstanding rigid boss surrounded by a spindle whirl, a self-adjusting bolster having direct alining contact with the bore of such boss above and below the plane of the whirl, and counterbored at the top to provide a spindle clearance within such bolster and within the boss, in combination with a whirl-supporting spindle-blade having upper and lower metal to metal bearings upon such bolster, the said upper spindle bearing being of less vertical extent than the said alining bearing of the bolster and intersected by the plane of the whirl.

2. A self-contained self-balancing spindle comprising a bolster-case having an upstanding rigid tubular boss surrounded by a spindle whirl, a self-adjusting bolster mounted within the case and boss below the top of the latter and having positive alining bearing upon the bore of such boss, such bearing being intersected by the plane of the whirl, in combination with a whirl-supporting spindle-blade journaled in metal to metal contact with the upper and lower bearings on the interior of the bolster, the uppermost of its bearings being of less vertical extent than the said alining bearing and being also intersected substantially at its middle by the plane of the whirl, the said whirl being driven onto the spindle blade and spaced a distance equal to two or more diameters of the spindle blade from the said uppermost bearing.

3. A self-contained, self-balancing spindle comprising a rigidly supported bolster-case having an upstanding rigid boss surrounded by a spindle whirl, a metal bolster self-adjustingly supported and contained within the case and boss and having direct bearing contact on the bore of such boss above and below the plane of the whirl adapted for positively alining said bolster with the axis of the spinning ring, such bolster being internally bored, and thereby providing a foot-step bearing for the spindle, a clearance for the spindle above such bearing, and an upper bearing for the spindle extending upward from said clearance to a point below the top of the bolster, whereby said bearing terminates below the upper end of said alining bearing, in combination with a spindle blade supported in metal to metal contact with the said upper and foot-step bearings of the bolster and having said whirl thereon.

4. A self-contained, self-balancing spindle comprising a rigidly supported bolster-case having an upstanding rigid boss surrounded by the spindle whirl, a self-adjusting metal bolster within the case and boss in direct bearing contact on the bore of the latter above and below the plane of the spindle band, such bolster being provided with a foot-step bearing for the spindle, and a clearance space above such bearing, and also with an upper spindle bearing intersected by the plane of the spindle band, in combination with a spindle having a blade supported in metal to metal contact with the said interior bearings in such bolster, said blade having a diameter in the region of its engagement with the upper of said bearings, which equals or is greater than one-third of the length of said bearing.

5. In a self-contained, balancing spindle having a bolster case provided with an oil reservoir and an upstanding rigid boss, a self-adjusting spindle bolster therein having its top below the top of the boss and internally bored to provide a foot step and an upper spindle bearing, and counterbored at the top to provide an open spindle clearance above the upper spindle bearing, a longitudinal channel formed on the exterior of the bolster intersecting the said counterbored clearance space whereby the oil therein may pass to the said oil reservoir, and one or more perforations in the lower part of the bolster for admitting oil to the spindle below the said upper bearing.

In testimony whereof, I have signed this specification in the presence of two witnesses.

GEORGE M. WHITIN.

Witnesses:
OSCAR L. OWEN,
ROBERT L. METCALF.